Sept. 1, 1964 C. C. WALLACE, JR 3,146,958
PULVERIZING PROCESS AND APPARATUS
Filed April 19, 1961 9 Sheets-Sheet 1

FIG.1

INVENTOR.
CURTIS C. WALLACE, JR.
BY Harry J. McCauley
ATTORNEY

Sept. 1, 1964     C. C. WALLACE, JR     3,146,958
PULVERIZING PROCESS AND APPARATUS
Filed April 19, 1961     9 Sheets-Sheet 5

INVENTOR.
CURTIS C. WALLACE, JR.
BY Harry J. McCauley
ATTORNEY

INVENTOR.
CURTIS C. WALLACE, JR.
BY Harry J. McCauley
ATTORNEY

FIG. 24

United States Patent Office 3,146,958
Patented Sept. 1, 1964

3,146,958
PULVERIZING PROCESS AND APPARATUS
Curtis C. Wallace, Jr., Newark, Del., assignor to E. I. du Pont de Nemours and Company, Wilmington, Del., a corporation of Delaware
Filed Apr. 19, 1961, Ser. No. 104,148
4 Claims. (Cl. 241—15)

This invention relates to an improved process and apparatus for pulverizing, and particularly to an improved process and apparatus for obtaining size reduction of highly extensible materials at ordinary temperatures.

There has long been a need for a method and apparatus for the size reduction of highly extensible materials such as polymers, especially thermoplastics, ductile metals and similar substances. However, it has not hitherto been possible to conduct such size reductions at ordinary temperatures, because of two primary reasons: (1) the difficulty in obtaining high enough relative velocities of the impact element to effect fracture of the material in process and (2) the amount of work expended in the size reduction process, which resulted in such excessive heat liberation that the material in process either rewelded into undesirably large particles as final product, or was actually damaged by heat. In the case of metallic substances, where the heat is not sufficient to cause damage to material in process, the large deformation accompanying size reduction results in work hardening which is often highly objectionable as regards ultimate uses, such as in powder metallurgy and the like.

It is true that resort to deep refrigeration of the material to be pulverized, accompanied by extraordinary cooling measures applied to the mill, is partially effective in facilitating the size reduction of extensible materials; however, even such measures are not effective for many substances, besides being prohibitively expensive, characterized by low production rates and otherwise objectionable.

An object of this invention is to provide an improved process and apparatus for the pulverizing of highly extensible materials such as polymeric substances, ductile metals and the like. Another object of this invention is to provide an improved process and apparatus for size reduction which generates a very low amount of heat per pound of product throughput, has a relatively high rate of production, is economical in first cost and maintenance and delivers a product which has very good uniformity of particle distribution. The manner in which these and other objects of this invention are obtained will become apparent from the detailed description and the drawings, in which:

FIG. 5 is a fragmentary section taken on line 5—5, FIG. 4, FIG. 7 is a partially schematic plan view of five different shapes of impact elements useful in the practice of this invention, FIG. 8 is a side elevation of a preferred embodiment of impact element utilized for the horizontally disposed row of the apparatus of FIGS. 2 and 6, FIG. 14 is a perspective view of a preferred design of mounting for attachment of the horizontal impact elements to the rotor in the apparatus of FIGS. 2 and 6.

Generally, this invention consists of a process and apparatus for pulverizing highly extensible materials comprising, in sequence, suspending coarse particles of the materials in an inert fluid medium, impacting the coarse particles at impact rates which strain the materials past the point of particle fracture more rapidly than the stresses set up in the materials can be dissipated by plastic deformation of the molecular structure of the materials, and withdrawing the materials suspended in the inert fluid medium from the region of the impacting.

The terms employed in this description and the claims are defined as follows: "coarse" particles—those having a size of not greater than about ½″ maximum diameter; "highly extensible" materials—materials which display an elongation of 30% or higher prior to breaking under the application of tensile stress; "inert fluid" medium—any fluid, liquid or gaseous, which does not enter into a significant chemical reaction with the material being pulverized and which, additionally, does not dissolve the material in excessive amount.

Physical research underlying this invention has revealed that different materials respond to the application of stress in characteristic ways which suggest a basic difference in structure. Thus, brittle materials suffer abrupt fracture when strained to the point of failure, a phenomenon which occurs at relatively moderate impact rates which are sufficient to initiate cracks, which thereafter propagate readily, with little expenditure of energy, along planes of weakness existing between layers of atoms in the brittle atomic lattice. Such planes exist in all dimensions of the lattice, so that cracks propagate simultaneously along all three axes at energies only slightly higher than those necessary to initiate fracture in the direction of impact. This triaxial fracture along regular planes produces the geometrically shaped fragments characteristic of brittle fracture.

Planes of weakness also exist in extensible materials; however, the cohesive forces between the atomic layers are such that the layers slip in a manner relieving the applied stress, rather than fracturing as in the case of brittle materials. As the rate of application of stress increases, the relative resistance to plastic slip also increases, due to interatomic inertia and frictional and viscoelastic effects. Thus, at very high rates of stress application, i.e., high impact velocities, the stress attains ultimate tensile levels before appreciable slip can occur, whereupon the extensible material fails in triaxial fracture by the same mechanism as a brittle material.

It is the objective of this invention to pulverize material in largely brittle fracture, by which is meant the effectuation of size reduction within 30% or less of the ultimate elongation displayed by the material, and to do this at ambient temperatures above about −40° F.

It has been found that highly extensible materials require a work input to effect fracture which is a function of the draw ratio at which fracture is accomplished. The relationship of work input to draw ratio for a typical highly extensible material is shown in FIG. 1.

Figure 1:
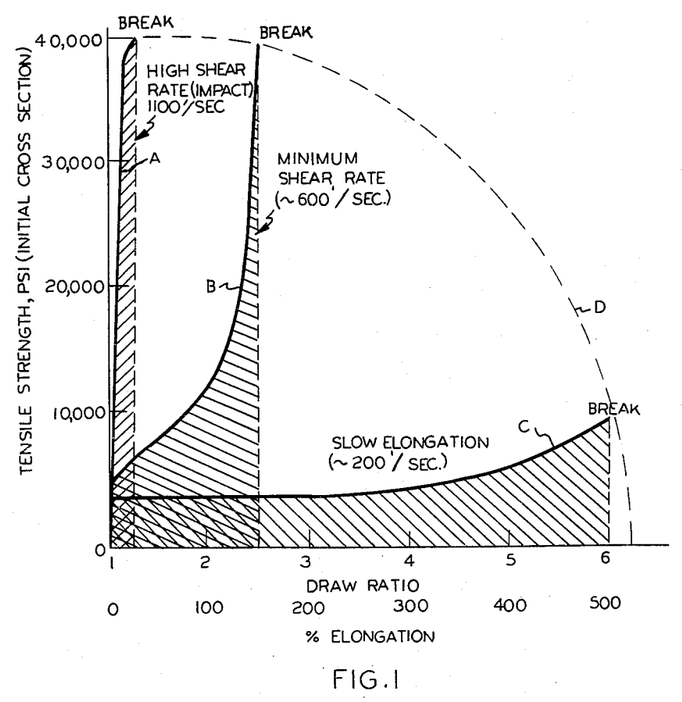
FIG. 1 is a plot of draw ratio (and percent elongation) versus tensile strength based on initial cross section for a 6—6 nylon polymer of approximately 100,000 molecular weight under impacting effected in air.

The material chosen as an example for the break tests of FIG. 1 was a representative thermoplastic, namely, the polyamide 6—6 nylon, by which is meant the reaction product of hexamethylene diamine (which has 6 C atoms) and adipic acid (which also has 6 C atoms), which, in this instance, possessed a molecular weight of about 100,000. The plot shows the breakage of three samples having substantially identical physical properties at different shear rates varying, respectively, from a very high velocity shear rate A of approximately 1100'/sec., through a limiting high velocity shear rate B of approximately 600'/sec., to a relatively low velocity shear rate C of about 200'/sec. In all cases the break point of the sample is indicated, and it has been found from extensive test experience that breakage occurs along a curve D connecting the break points of the several samples. The cross-hatched areas under the three curves A, B and C constitute a direct measure of the work necessary to shear the samples, and this work amounted to approximately 30 B.t.u./lb. at rate A, 60 B.t.u./lb. at rate B and 120 B.t.u./lb. at rate C.

The temperature rise incident to the release of 120 B.t.u./lb. (i.e., rate C) corresponds, under ordinary circumstances, i.e., practicable rate of heat transfer capabilities and the like, to about 150° C., which is much too high for nylon 6—6, in that the polymer both softens and suffers heat degradation at this resulting temperature. In contrast, shearing at rate B corresponds approximately to a temperature rise of only about 75° C., which can be tolerated at product throughput rates in the typical range of about 400 to 1000 lbs./hr. for the gas phase embodiment hereinafter described, an economic production level.

With certain types of materials it may be advantageous to conduct the size reduction at even higher shear velocities approaching a practicable limit of about rate A and, in general, grinding anywhere within the range bounded by curves the equivalent of A and B is entirely satisfactory from the standpoint of heat release as a function of shear rate. Of course, it will be understood that the work necessary to break specific polymers varies somewhat with each and, also, that the tolerable temperature rise in any instance depends upon the nature of the material which is to be pulverized. As a general rule, however, it can be said that size reduction conducted at impact rates in the range of about 600'/sec. to about 2500'/sec. is satisfactory for most thermoplastic materials, such as, for example, the polyesters, polyamides and polyunsaturates as classes. Additionally, metallic substances, both elemental and alloy, which possess high ductilities falling within the range of up to about 30% elongation before severance, have also displayed breakage characteristics which bring them within the family of highly extensible materials to which this invention applies. Thus, this invention contemplates pulverization of highly extensible materials at shear rates effecting particle fracture at elongations less than about 30% of the ultimate inherent elongation of the material, which, in the case of 6—6 nylon, corresponds to about 150% elongation, the ultimate elongation constituting about 500%, or to an equivalent draw ratio of about 2.5.

It will be understood that the impacting velocities hereinabove referred to are the true relative speeds of the impactor with respect to the material being pulverized and not merely the absolute speeds of the impaction elements. These speeds are thus, referred to liquids as fluid, of the order of Mach 0.1 to above Mach 1.0 (referred to gases even higher), and are achieved only by special design and arrangement of the impact elements, bearings and other machine components. It is also necessary to choose carefully the materials of construction of the pulverizing apparatus, since operation is in a speed region imposing strains which approach the ultimate strength limits. Equally as important, however, is the fact that the impact elements must be of a streamlined design which minimizes shock wave patterns reducing relative impact-to-particle motion and concurrently reduces frictional heat losses arising out of contact with the inert fluid support medium.

A preferred design of apparatus for the pulverization of highly extensible materials suspended in air as the inert fluid medium is that shown in FIGS. 2 to 14. This employes two counter-rotating members in order to obtain the very high impact speeds utilized according to this invention, the uppermost of which is the feed-directing rotor indicated generally at 10, whereas the lower is the rotor 11 carrying the impact elements.

Figure 2:
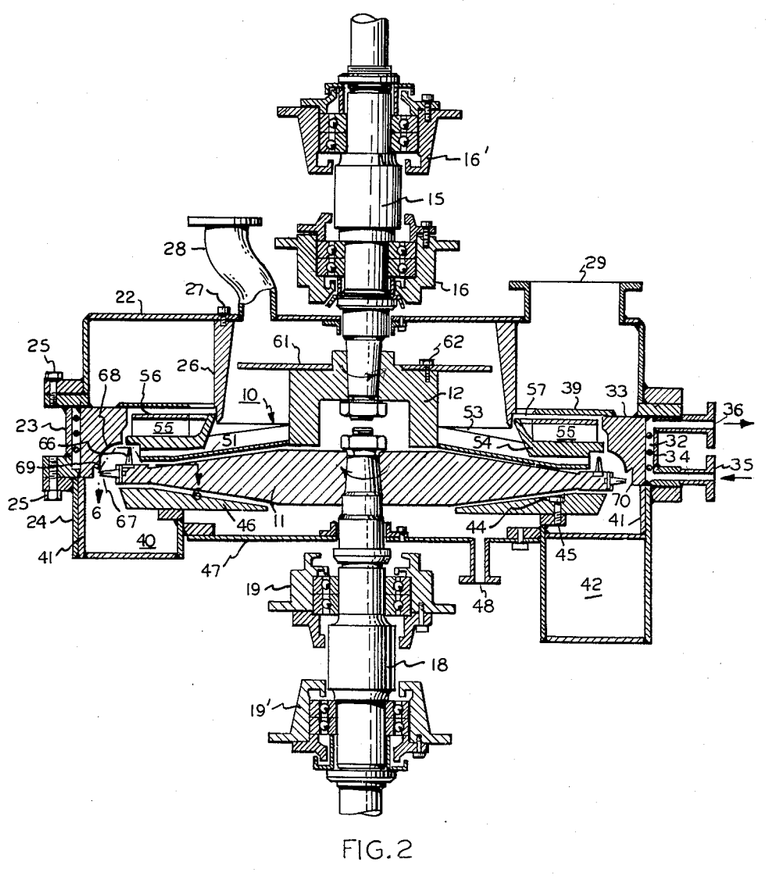
FIG. 2 is a vertical sectional view of a preferred embodiment of pulverizing apparatus according to this invention using a gaseous particle-supporting fluid.

Rotor 10 is fixedly connected at its hub 12 to the lower end of drive shaft 15 carried in support bearings 16, 16' and driven from a motor, not shown, keyed to its upper end. Similarly, rotor 11 is fixedly attached to drive shaft 18 carried in support bearings 19, 19' and driven from a second motor, not shown, keyed to its lower end. The rotors are mounted within a three-part housing made up of a top section 22, a middle section 23 and a bottom section 24, joined one to another through integral abutting flanges and machine screws 25. Section 22 is provided internally with a downwardly depending seal ring 26, held in position by machine screws 27. The feed inlet connection 28 discharges adjacent the inside periphery of seal ring 26, whereas cooling air is supplied through inlet connection 29 opening exteriorly of the seal ring.

Middle section 23 constitutes the outer wall of a cooling jacket 32, the inner wall of which is a solid metal ring 33 fabricated from a wear-resisting alloy (e.g., 18.5% Cr, 2.5% C, 0.5% Si, appreciable amounts of V or Mo, balance Fe), or which, alternatively, can be of high strength alloy steel sheathed on all inside surfaces confronting rotors 10 and 11 with Stellite or other extremely hard protective facing. Mounted within jacket 32 is a coolant flow-directing spiral 34 which can be fabricated from metal bonded to both 23 and 33 to make up an integral assembly. Cooling water inlet and exit ports 35 and 36, respectively, lead into jacket 32. Finally, a solid metal annular air flow restriction ring 39 is provided extending radially inwards of the top surface of ring 33 and welded peripherally thereto.

Bottom section 24 is formed to provide a volute product-carrier gas discharge passage 40, sheathed on the inside with wear-resisting metal cladding 41, and opening to a product exit port 42. This section supports, by screw attachment 44 to internal flange 45, annular base plate 46, which is machined to conform to the bottom surface of rotor 11 with a close clearance barring the carry-over of substantial quantities of product borne along in the inert gas support stream. A central closure piece 47 attached to the bottom section 24 seals off the pulverizing chamber, and this is provided with a gas supply port 48 through which gas is introduced under pressure to scour the rotor 11-base plate 46 interspace and keep it clear of particles which, by build-up therein, might interfere with rotation.

While FIG. 2 is directed to a design of apparatus as to which FIGS. 3, 4 and 5 constitute an alternative design, the constructions of the feed-directing rotor 10 are identical except in the respects hereinafter described, and will thus be elaborated by reference to all of these figures together. Feed-directing rotor 10 consists of a solid plate 51 sloped downwardly to a point about 0.10 rotor diameter from the periphery in a radially outward direction from the center of shaft 15 at an angle of about 15° and provided with a multiplicity of upstanding vanes 53 (in this instance sixteen in number). Vanes 53 are fixedly attached along their base surfaces to plate 51 and are additionally secured at their outward extremities to fan ring 54, which is provided on its top face with a multiplicity of short length fan blades 55 (not shown in FIGS. 3 and 4) which are adapted to draw quench air through port 29, should additional cooling or air sweep of product out of the pulverizing chamber be desired. For additional strength, fan blades 55 can be braced one against the others by attachment to continuous annular top ring 56 welded thereto, ring 56 adjoining ring 39 with a close clearance so that the principal air intake of the fan is via annular opening 57.

Figures 5, 7, 8, 13:
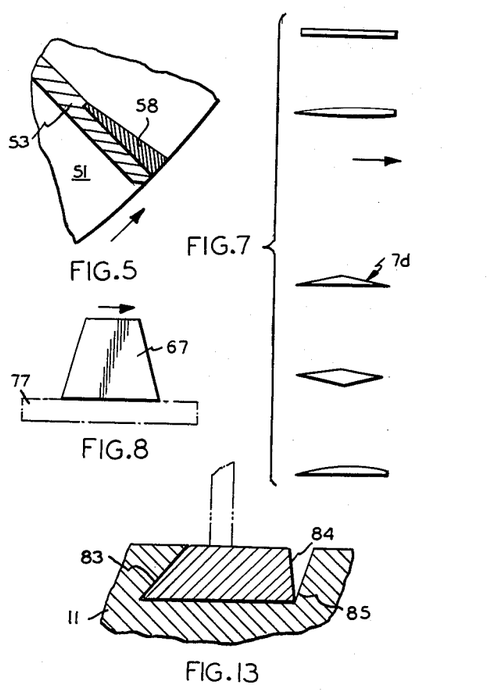

As shown in FIG. 5, it is preferred to provide the tips of vanes 53 with kicker elements 58 fabricated from Stellite or the equivalent and tapered to an increased cross section radially outwards of rotor 10, which kicker elements are mounted, as by welding or brazing, within matching recesses machined in the outboard ends of the vanes.

The hub 12 of rotor 10 is provided at the top with a feed distributor 61 attached thereto with machine screws 62, which distributor is typically provided with four vanes 63 disposed equidistantly apart at intervals of 90°.

Figure 6:
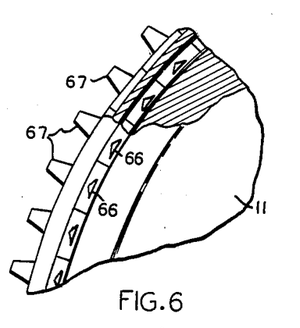
FIG. 6 is a fragmentary section taken on line 6—6, FIG. 2, part of the rotor being cut away to better show the attachment of the impact elements.

Turning now to the construction of rotor 11 employed in the apparatus of FIGS. 2 and 6, a preferred apparatus utilizes two rows of impact elements, both mounted on the lowermost rotor co-acting with rotor 10. The first row consists of upstanding teeth 66 which are spaced evenly around the periphery of rotor 11 at intervals of about 6°, with a trailing edge-to-leading edge clearance therebetween of, typically, 0.5 tooth width. Teeth 66 obtrude normally to the radii of rotors 10 and 11 across the full height of the several feed discharge paths defined by vanes 53, at a radial clearance from the periphery of plate 51 of about 0.25″. The second row of impact elements is made up of teeth 67 located on the same general radial lines of rotor 11 as teeth 66, but oriented 90° thereto, so as to be generally horizontal. Teeth 67 can be of about the same height as teeth 66, but of different design as hereinafter detailed, and fit closely (e.g., with 0.25″ clearance) with respect to the adjacent face of ring 33. The inside face of ring 33 is preferably machined to an upper arcuate surface 68 opposed to teeth 66, so as to redirect solid particles passing the first row of impact elements into a line generally normal of the path of travel of teeth 67, and the lower terminal edge 69 of surface 68 is disposed radially inwardly of rotor 11 in slight overlapping relationship with the ends of teeth 67, so as to prevent by-passing of material in avoidance of the second row of impact elements. The lower edge of ring 33 is recessed at 70 (right-hand side, FIG. 2) to provide an anvil against which particles are projected by teeth 67.

Figure 3:
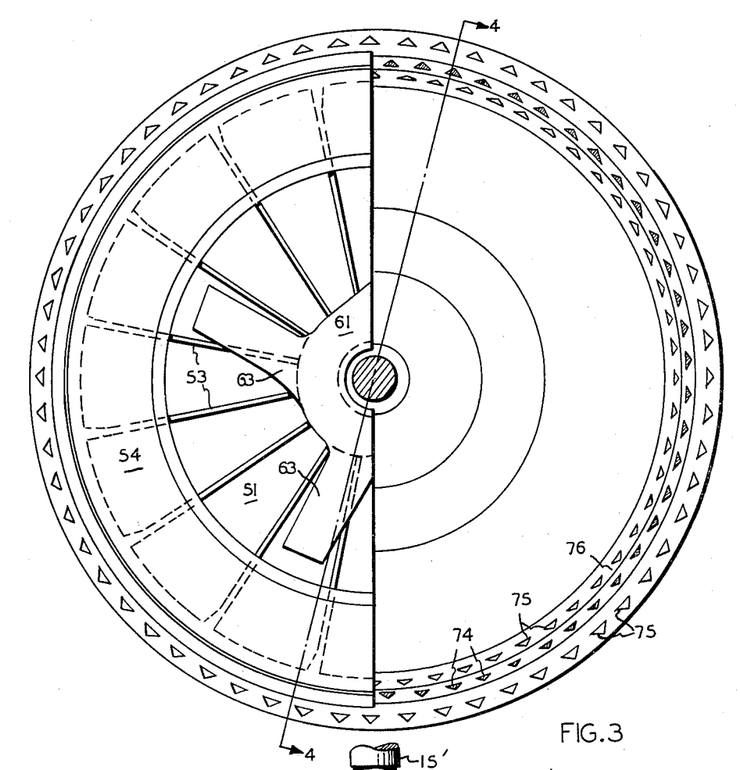
FIG. 3 is a top plan view of the feed-directing rotor with all details above the fan ring eliminated of an alternative design to that shown in FIG. 2, showing also the peripheral edge of the co-acting rotor extending radially beyond the feed-directing rotor.
Figure 4:
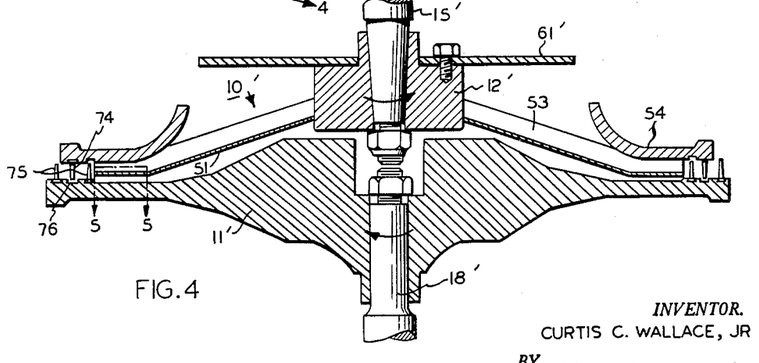
FIG. 4 is a section taken on line 4—4, FIG. 3.

The arrangement of impact elements in the design of FIGS. 3–5 is different from that of FIGS. 2 and 6 only in that one row of additional teeth, namely, those denoted by reference numeral 74, is mounted in downwardly depending relationship from the fan ring 54, integral with rotor 10′, so as to interdigitate with two rows of upstanding teeth 75 of identical design carried by rotor 11′. It is preferred to recess the top of rotor 11′ peripherally to provide a close clearance concave trackway 76 opposite teeth 74 for enhanced pulverizing action. In this embodiment, horizontally disposed teeth, such as those designated 67 in FIGS. 2 and 6, are dispensed with, and all of the teeth employed can be of identical design with those denoted 66.

It is obviously possible to provide more than one set of interdigitating impact elements by mounting a plurality of rows of downwardly disposed teeth 74 on the top rotor 10 co-operating with adjacent rows of teeth 75 on the bottom rotor; however, our research has indicated that more than four rows of impact elements are seldom advantageous. Also, it is practicable to provide a row of horizontally disposed teeth, such as 67 of FIGS. 2 and 6, on the periphery of the lower rotor of designs incorporating interdigitating teeth but, usually, the additional expense is not warranted.

A wide variety of impact element tooth shapes is practicable for apparatus constructed according to this invention. However, these must be carefully streamlined to present an airfoil resistance to the fluid within the pulverizing zone in the interests of conserving driving horsepower, eliminating frictional heat, obtaining true contact velocity approaching the rotor velocity by elimination of shock waves arising out of nonstreamlined flow, and, most importantly, surviving the heavy shock loads incurred in particle collisions at the extremely high speeds involved. In general, the streamlining should be effective enough so that the power consumption is less than about 0.7 H.P./in. of frontal blade length traveling in particle-free air at 1000′/sec., or less than about 1.5 H.P./in. in water at 250′/sec.

Relatively thin elements having cross sections varying from generally rectangular to diamond-shaped as shown in FIG. 7, when moved in the direction of the arrow, possess streamlined characteristics which make them at least partially effective for the purposes of this invention. Of these, it is preferred to use a modification of the design shown at 7d for the teeth denoted 66 (FIG. 2) and 74 and 75 (FIGS. 3 and 4), whereas a rectangular cross section blade side elevational profile as shown in FIG. 8 is preferred for teeth 67 (FIG. 6).

In general, it has been found that the aspect ratio, $L/T$ (i.e., length divided by thickness) must be greater than about 6:1 to avoid high frontal friction losses. An upper limit of about 15:1 is necessary to safeguard against collapse of the streamlines on the trailing edges of the impact elements, together with accompanying localized overheating. A preferred aspect ratio is about 12:1.

An attack angle (i.e., inclination of the leading edge of the impact element with respect to the instantaneous direction of velocity) of less than about 15° (preferably zero) is essential to avoid excessive pumping with concomitant friction losses. The attack angle, in geometric terms, constitutes the angle between a plane passed through the leading and trailing edges of the impact element and a tangent drawn to the radius of the rotor at the midpoint of the impact element.

In addition, impact elements must possess a proper geometry in order to resist the heavy impact forces inherent in the pulverizing process. This is because ultimate tensile stresses are developed in the materials in process, and these approach the ultimate tensile strength of the available materials of construction. Thus, geometry which multiplies stresses in the region of attachment of the element to the driver must be avoided. The following general limits apply: (1) the ratio $h/L$ (i.e., height divided by length) should be less than about 2, and preferably should be about 0.8, and (2) the projected area at the tooth crest/base area should likewise not exceed about 2, and preferably should be about 0.8. Both of these ratios can be increased by special support geometry at top and bottom, provided that the over-all streamlined flow pattern is not thereby destroyed.

Figure 9:
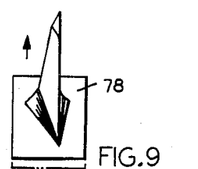
FIG. 9 is a perspective view of a preferred embodiment of impact element utilized as the upstanding teeth of the apparatus of both FIG. 2 (and 6) and FIG. 3 (and 4)
Figure 10:
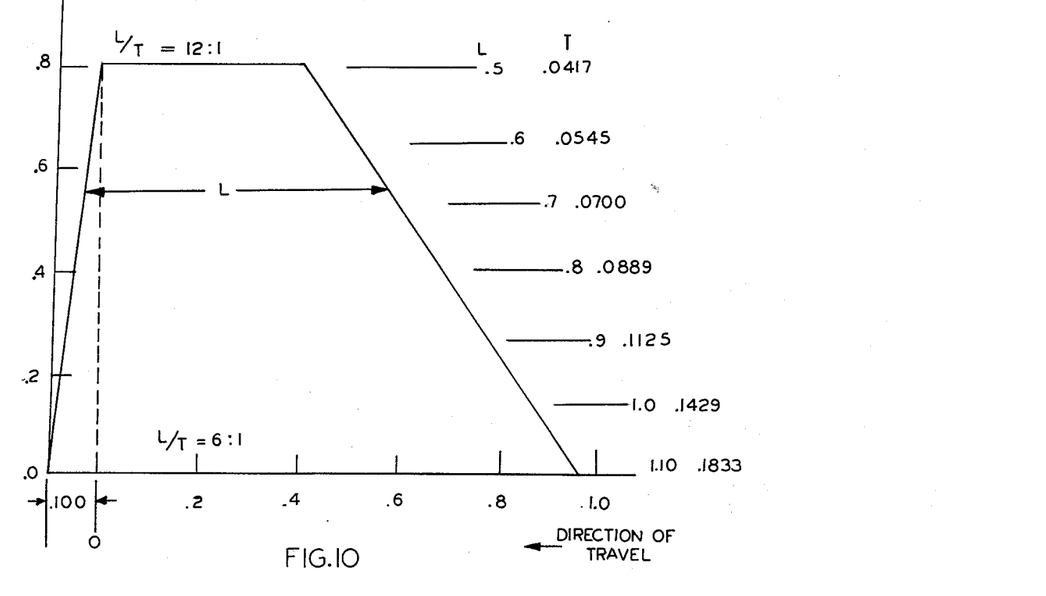
FIG. 10 is a dimensional ratio side elevation representation of the impact element of FIG. 9.
Figure 10A:
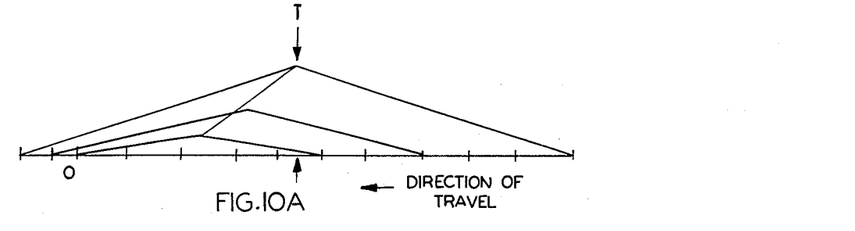
FIG. 10a is a dimensional ratio top plan representation of the impact element of FIG. 9, FIGS. 11, 12 and 13 are cross sectional detail views of different types of preferred interlocking mountings which can be employed for attachment of the impact elements to their supporting rotors.

Employing these principles, a preferred impact element design for teeth 66, 74 and 75 is that shown in perspective in FIG. 9, and as to dimensional ratios in FIGS. 10 and 10a, the direction of drive during pulverization being indicated by arrows drawn in adjacent to each of the showings. It will be seen that this tooth is of generally half-diamond cross section, tapered progressively to reduced area at the crest, with the flat side of the tooth oriented toward the feed material input as shown in FIGS. 3 and 6 particularly. As a compromise necessary to obtain highest strength, the $L/T$ ratio at the base was chosen to be the maximum limit of 6:1, tapering to the ideal value of 12:1 at the crest.

All impact elements must be constructed from metals or alloys possessing a working strength of 80,000 p.s.i. or higher, preferably about 150,000 p.s.i. and the fabrication technique employed should be such as to insure homogeneous development of mechanical properties throughout the full volumes of the elements.

Figure 11:
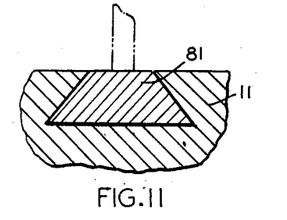
Figure 12:
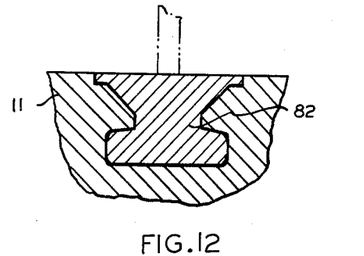

The impact elements are preferably fabricated with integral base pieces 77 and 78, as indicated in FIGS. 8 and 9, respectively, and these can be machined to a variety of cross sections to adapt them to interlocking attachment within matching grooves provided in their supporting rotors. Thus, as shown in FIG. 11, the bases can have a trapezodial cross section 81, or an inverted trapezodial cross section with enlarged base extension as shown at 82 in FIG. 12. Assembly is facilitated by providing a cutaway region in the rotors slightly greater than one base length, so that individual teeth can be placed therein and thereafter slid along the retaining groove until the row is completely filled, after which the entrance way is closed off by welding or in other manner.

Yet another type of attachment is that shown in FIG. 13, wherein the base is formed with a highly sloped edge on the surface 83 disposed towards the center of rotor 11 and a near-vertical opposite surface 84. This design is adapted to cemented attachment to the rotor along surface 83, and the groove 85 receiving the elements is open to the extent shown around the entire circumference, so that all elements can be put into place by simply slipping them into the groove at any point around the periphery of the rotor.

A different type of attachment is preferred for the horizontal impact elements 67, this consisting of the lock piece 88 shown in FIG. 14, to which tooth 67 is attached by welding or integral fabrication. This lock piece is adapted to fit into a horizontal groove machined around the periphery of rotor 11, to which attachment is effected by a pair of machine screws passed through drilled holes 89.

The following test runs were conducted on a mill constructed according to FIGS. 2 and 6, but in which horizontal teeth 67 were dispensed with, wherein rotor 11 had a diameter of 27" and was provided with fifty-nine impact elements spaced at a pitch of approximately 1.4". The height from base to tip of impact elements 66 was 1", the thickness ranged from 1/8" at the base to 5/64" at the crest, and the length was 1".

The feed was entrained in an air stream at the rate of 0.25 lb. solid/lb. of air/min. and supplied to the apparatus at a solids rate of 2000 lbs./hr. In all instances the velocity of rotor 10 was 3500 r.p.m., whereas that of rotor 11 was 6000 r.p.m. This corresponded to a shear rate of 1100 ft./sec., well within the curve A—B bounded region of FIG. 1. The power consumption per lb. of product was approximately 0.1 H.P. for all runs.

EXAMPLE 1

The material pulverized was nylon 6–6, a condensation polymer of hexamethylene diamine and adipic acid (molecular weight approximately 100,000) introduced into the apparatus as granules averaging about 1/4" diameter wherein 0% passed a 20 mesh screen. The following size reduction progress was observed:

*Sieve Analyses of Product in Terms of Percent by Weight Through Standard Sieves of Given Mesh Size*

| Mesh size of sieve | 20 | 40 | 60 | 80 | 100 |
| --- | --- | --- | --- | --- | --- |
| | Percent | Percent | Percent | Percent | Percent |
| (a) First pass through apparatus: temp. at start 100° F., temp. at end 120° F., solids throughput 50 lbs. | 26.6 | 6.2 | 2.1 | 2.1 | 2.1 |
| (b) Second pass through apparatus: temp. at start 100° F., temp. at end 115° F., solids throughput 45 lbs. | 59.3 | 24.2 | 9.2 | 5.5 | 5.5 |
| (c) Third pass through apparatus: temp. at start 100° F., temp. at end 110° F., solids throughput 40 lbs. | 74.1 | 40.1 | 14.8 | 7.4 | 3.7 |
| (d) Fourth pass through apparatus: temp. at start 100° F., temp. at end 110° F., solids throughput 35 lbs. | 79.6 | 46.3 | 14.8 | 7.4 | 3.7 |

EXAMPLE 2

The material pulverized was nylon 6, that is, in an addition polymer of caprolactam made by opening the ring of the caprolactam and coupling to a long-chain structure (molecular weight approximately 75,000) introduced into the apparatus as granules averaging about 3/8" diameter, wherein 0% passed a 20 mesh screen. The following size reduction progress was observed:

*Sieve Analyses of Product in Terms of Percent by Weight Through Standard Sieves of Given Mesh Size*

| Mesh size of sieve | 20 | 40 | 60 | 80 | 100 |
| --- | --- | --- | --- | --- | --- |
| | Percent | Percent | Percent | Percent | Percent |
| (a) First pass through apparatus: temp. at start 100° F., temp. at end 120° F., solids throughput 50 lbs. | 48.8 | 11.6 | | | |
| (b) Second pass through apparatus: temp. at start 100° F., temp. at end 115° F., solids throughput 45 lbs. | 66.0 | 26.0 | 10.0 | 6.0 | 4.0 |
| (c) Third pass through apparatus: temp. at start 100° F., temp. at end 110° F., solids throughput 40 lbs. | 74.1 | 37.1 | 14.9 | 7.4 | 3.7 |
| (d) Fourth pass through apparatus: temp. at start 100° F., temp. at end 110° F., solids throughput 35 lbs. | 80.0 | 44.0 | 16.0 | 8.0 | 4.0 |

EXAMPLE 3

The material pulverized was a polyacetal resin which was a condensation polymer of the enol (di-hydroxy) form of formaldehyde (molecular weight approximately 45,000) introduced into the apparatus as granules averaging about 3/16" diameter, wherein 0% passed a 20 mesh screen. The following size reduction progress was observed:

*Sieve Analyses of Product in Terms of Percent by Weight Through Standard Sieves of Given Mesh Size*

| Mesh size of sieve | 20 | 40 | 60 | 80 | 100 |
| --- | --- | --- | --- | --- | --- |
| | Percent | Percent | Percent | Percent | Percent |
| (a) First pass through apparatus: temp. at start 100° F., temp. at end 120° F., solids throughput 50 lbs. | 43.2 | 19.7 | 11.7 | 7.8 | 3.9 |
| (b) Second pass through apparatus: temp. at start 100° F., temp. at end 115° F., solids throughput 45 lbs. | 59.3 | 26.0 | 11.1 | 7.4 | 3.7 |
| (c) Third pass through apparatus: temp. at start 100° F., temp. at end 110° F., solids throughput 40 lbs. | 72.5 | 37.3 | 19.7 | 11.8 | 7.9 |
| (d) Fourth pass through apparatus: temp. at start 100° F., temp. at end 110° F., solids throughput 35 lbs. | 77.8 | 44.5 | 22.3 | 14.9 | 11.2 |

EXAMPLE 4

The material pulverized was a saturated polyester resin, the product of reaction of ethylene glycol and terephthalic acid (molecular weight approximately 60,000) introduced into the apparatus in a preground state having the sieve analysis reported "As-Received." The following size reduction progress was observed:

*Sieve Analyses of Product in Terms of Percent by Weight Through Standard Sieves of Given Mesh Size*

| Mesh size of sieve | 20 | 40 | 60 | 80 | 100 |
|---|---|---|---|---|---|
| | Percent | Percent | Percent | Percent | Percent |
| As-Received analysis | 76.0 | 36.0 | 12.0 | 4.0 | 4.0 |
| (a) First pass through apparatus: temp. at start 100° F., temp. at end 120° F., solids throughput 50 lbs | 84.0 | 48.0 | 16.0 | 8.0 | 4.0 |
| (b) Second pass through apparatus: temp. at start 100° F., temp. at end 115° F., solids throughput 45 lbs | 88.0 | 56.0 | 24.0 | 16.0 | 8.0 |
| (c) Third pass through apparatus: temp. at start 100° F., temp. at end 110° F., solids throughput 40 lbs | 92.2 | 68.7 | 31.4 | 19.6 | 11.8 |
| (d) Fourth pass through apparatus: temp. at start 100° F., temp. at end 110° F., solids throughput 35 lbs | 90.0 | 64.0 | 30.0 | 20.0 | 12.0 |

Additional tests were conducted on the apparatus hereinabove described for the purpose of obtaining comparative performance in the pulverizations of polymers, elastomers and metallics and these are tabulated in summary as follows:

| | Material | | | |
|---|---|---|---|---|
| | Polymer | | Elastomer—An addition polymer of ethylene (mol. wt. about 50,000) which was subsequently chloro sulfonated | Ductile metallic—Pure Ti sponge, about 80 Brinell Hardness |
| | Polyamide—Nylon 6-6 mol. wt. 100,000 | Polyester—Saturated reaction product of ethylene glycol and terephthalic acid, mol. wt. 60,000 | | |
| Feed size | ¼" | ⅛" | ¼" | ½" |
| Tensile strength, p.s.i. | 10,000 | 8,000 | 3,000 | 50,000 |
| Fluid support media | Air | Air | Air | Argon |
| R.p.m., rotor 10 | 3,400 | 3,400 | 3,400 | 3,400 |
| R.p.m., rotor 11 | 6,000 | 6,000 | 6,000 | 6,000 |
| Shear rate, ft./sec | 1,100 | 1,100 | 1,100 | 1,100 |
| Power consumption, HP./lb | 0.1 | 0.1 | 0.2 | 0.1 |
| Number of passes thru apparatus | 4 | 4 | 1 | (1) |
| Sieve analysis (U.S. Std. Mesh): | | | | |
| Percent thru 20 | 80 | 90 | 60 | 100 |
| Percent thru 40 | 46 | 64 | | 2 95 |
| Percent thru 60 | 15 | 30 | | 75 |
| Final equilibrium temperature, ° F | 130 | 135 | 145 | 125 |

¹ Closed circuit—The "closed circuit" here consisted of collecting the discharge from the mill in a cyclone collector, passing over a 20 mesh screen and returning the +20 mesh material continuously to the feed port. On the average, the material in pulverization passed through the mill about six times.
² Thru 30 mesh.

The foregoing examples show that the process of this invention is applicable broadly to highly extensible materials, without regard to the physical or chemical constitution thereof, since polymers and metals were pulverized equally readily. Moreover, the productivity in terms of lbs. of pulverized product per horsepower-hour was uniformly high. The particle size distribution in the pulverized product was unusually narrow, in that, by sieving out −40 mesh material and recycling the oversize to the feed, 70 to 80% of the weight of product obtained was in the −40 to +100 mesh size range for all of the materials tested. This narrow distribution is believed to result from the combination of reduced statistical probability of contacting a small particle plus increased fluid drag which reduces the effective velocity of a small particle. Microscopic examination revealed that the pulverized product consisted of relatively sharp-pointed geometric fragments characteristic of brittle fracture. As a consequence, polymer orientation and increased metal hardness due to working were both largely avoided.

A preferred embodiment of apparatus adapted to pulverize material in a liquid fluid medium is shown in FIGS. 15–23, inclusive.

Figure 15:
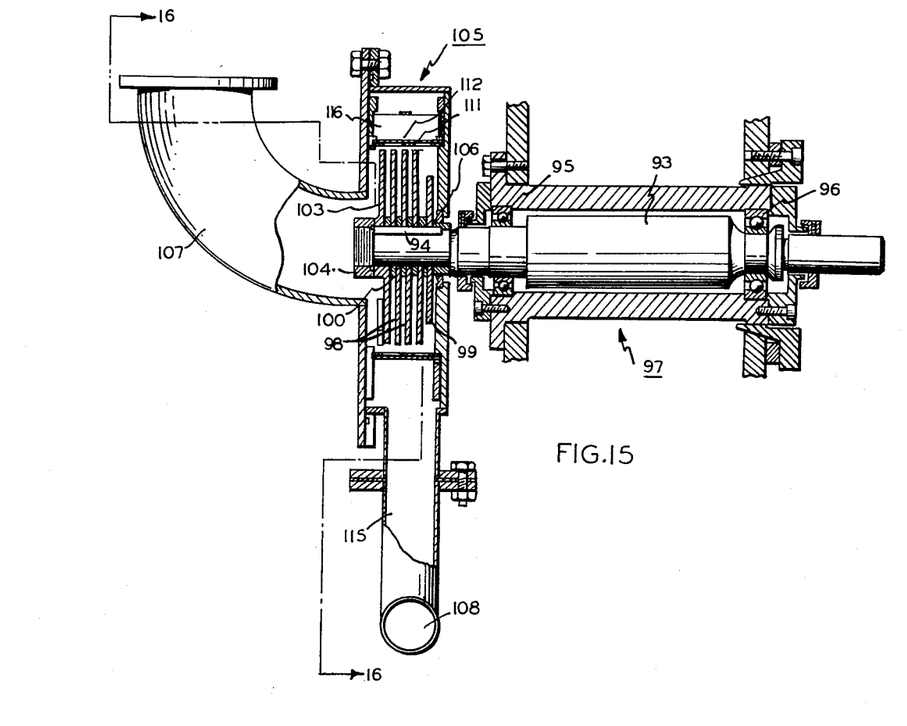
FIG. 15 is a vertical sectional view of a preferred embodiment of pulverizing apparatus according to this invention for use with a liquid particle-supporting fluid.

Here a single drive shaft 93 is employed, journaled in bearings 95 and 96 carried by the frame, indicated generally at 97. The impact elements are secured by key 94 on the outboard end of shaft 93, and comprise three equal-sized bladed structures 98 (outside diameter typically 8"). An inboard impeller 99 (outside diameter typically 6") is provided to reduce back pressure on the shaft seal ring hereinafter described. A slurry retention impeller 103 is mounted outboard of the impacting structures and the whole assembly held tightly in place by nut 104 screwed onto the threaded end of shaft 93. The impact elements and the impellers are separated one from another by washers 100 about ⅛" thick, providing an equal axial clearance therebetween.

The pulverization chamber consists of a housing, indicated generally at 105 which is of two-part bolted flange construction to permit assembly enclosing the impact elements. The chamber is provided with an inboard seal ring 106 barring leakage along shaft 93 and, opposite thereto, an inlet connection 107 for leading the feed into the apparatus axial of the drive shaft. A scuff plate 111-screen 112 sub-assembly encloses the pulverizing head around the entire periphery, any feed escaping the pulverizing region being drawn off through a bottom collector 115 opening into the annular free space 116 radially outwards of scuff plate 111-screen 112. Pulverized product delivery is via outlet connection 108.

Figures 19, 20, 25, 27, 28, 29:
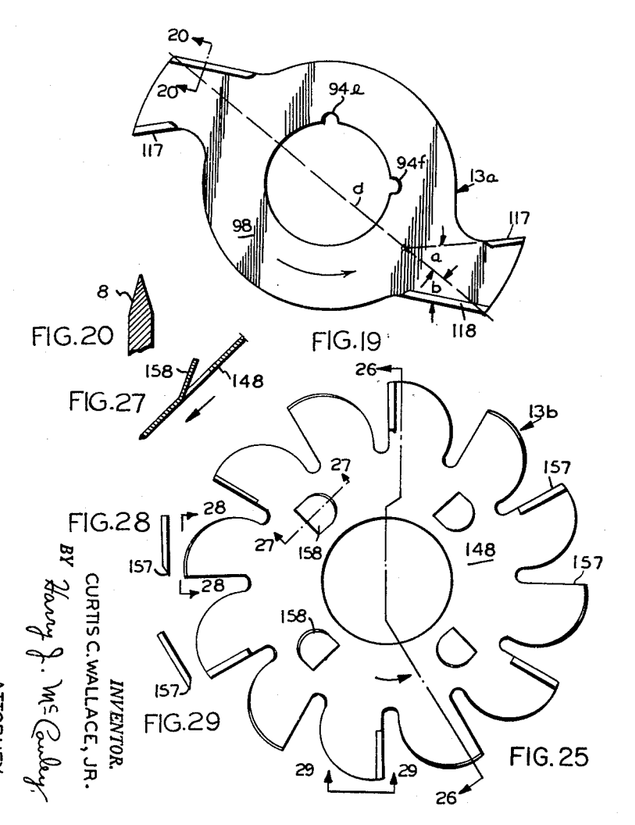
FIG. 19 is a full side elevation view of an impact element employed in the apparatus of FIGS. 15 and 16.
FIG. 20 is a section on line 20—20, FIG. 19.
FIG. 25 is a bottom plan view of an impact element of the apparatus of FIG. 24.
FIG. 27 is a section on line 27—27, FIG. 25.
FIG. 28 is a fragmentary end elevation taken on line 28—28, FIG. 25.
FIG. 29 is a fragmentary end elevation taken on line 29—29, FIG. 25.

The detailed construction of the impact elements 98 is shown in FIGS. 19 and 20, these consisting of unitary rotors having two arms disposed diametrically apart, which are curved circularly along their crest lines and are provided on both sides with streamlined blade edges of an included angle of about 30° as shown in FIG. 20. The leading edges of the rotor are those denoted 117, FIG. 19, and these are inclined at an angle $a$ (typically 45°) in the direction of rotation measured from the midpoint of the radius lying on the diameter line $d$. Similarly, the angle of disposition $b$ of the trailing sharpened edges 118 referred to the same diameter $d$ is that measured in the reverse direction, and can typically be about 15°. The lengths of edges 117 are typically ½", whereas those of edges 118 can be 1". For secure retention, two key ways 94e and 94f, spaced 90° around from one another, are provided in each rotor.

Figures 21, 22, 23, 26:
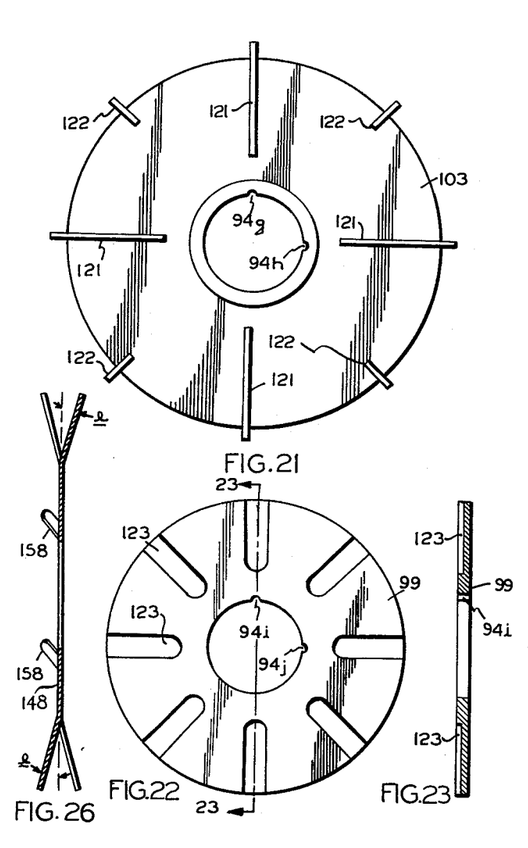
FIG. 21 is a side elevation view from the outboard side of the slurry retention impeller of the apparatus of FIGS. 15 and 16.
FIG. 22 is a side elevation view from the inboard side of the back pressure reducing impeller of the apparatus of FIGS. 15 and 16.
FIG. 23 is a section on line 23—23, FIG. 22.
FIG. 26 is a section on line 26—26, FIG. 25.

As shown in FIG. 21, the slurry retention impeller 103 is a circular rotor provided on its outboard face with two sets of four each rectangular cross section blades 121 (e.g., ¼" wide, 2½" long) and 122 (e.g., ¼" wide, 1" long), respectively, disposed at equiangular spacings around the circumference and overhanging the periphery radially a distance of, typically, ⅜". Keyways 94g and 94h are provided for attachment to shaft 93.

Inboard impeller 99 is a generally flat disk provided with a multiplicity of, in this instance eight, equiangularly disposed, radially directed grooves 123 opening peripherally of the disk and of a length (typically 2") approximately three-fourths the width of the disk. The depth of grooves 123 can be ⅛", and the width about ¼", which, when oriented opposite to the direction of feed into the apparatus, act to relieve seal ring 106 from excessive pressures by centrifugal discharge of material outward from this region. Impeller 99 is secured on shaft 93 by key attachment through key slots 94i and 94j.

Figure 16:
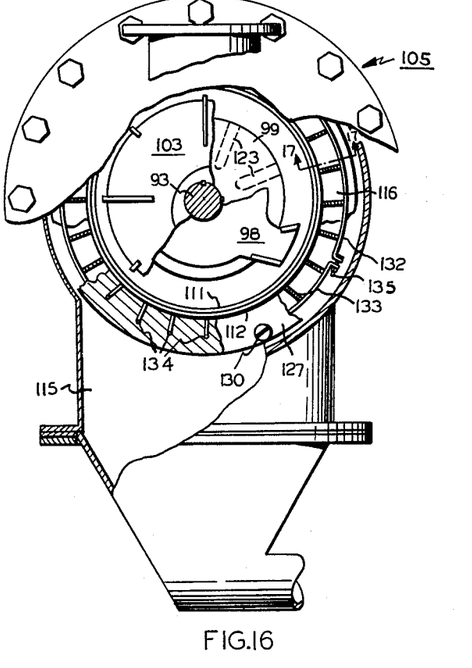
FIG. 16 is a partially broken section on line 16—16, FIG. 15.
Figure 17:
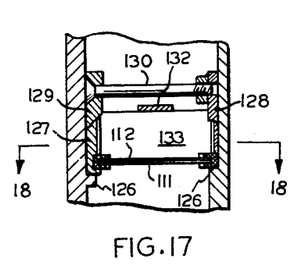
FIG. 17 is a section on line 17—17, FIG. 16.
Figure 18:
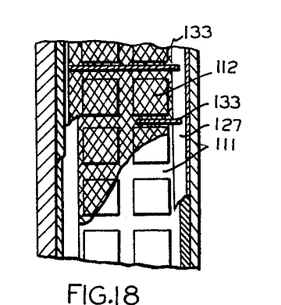
FIG. 18 is a section on line 18—18, FIG. 17.

Referring to FIGS. 16–18 inclusive, scuff plate 111 and sizing screen 112 can be cylindrical in construction, with the screen mounted radially outward of the plate, and both generally coaxial of shaft 93 with a clearance with respect to impact elements 98 of about 1/8″. Preferably, both walls of housing 105 are provided with peripherally machined shelves 126 against which a cage 127 backing the scuff plate-screen is adapted to abut. This cage is held in place by rings 128 and 129 biased securely against the inside walls of the casing by a number of bolts 130 disposed around the circumference at regular intervals. Additional back-up is provided by a split ring 132 (FIG. 16) provided with a number of radially disposed solid plates 133 integral with the ring, which abut screen 112 at frequent intervals around the cage at points opposite the solid cross members defining the openings in scuff plate 111, as shown in FIG. 18. The edges of plates 133 are adapted to fit slidably within radial grooves 134 cut in cage 127 and rings 128 and 129 to safeguard against angular misalignment with respect to scuff screen 111. When draw bolt 135 is tightened, ring 132 is reduced in circumference, bringing plates 133 snugly against screen 112 and scuff plate 111. Screen 112 can typically be 40 mesh, and the scuff plate can be machined with rectangular openings measuring about 1″ x 1″ size.

The apparatus hereinbefore detailed was employed to pulverize polyethylene (mol. wt. about 50,000) of 1/4″ average feed size, using water at 70° F. as the support fluid. The polyethylene had a tensile strength of 2000 lbs./sq. in. and an ultimate elongation of 400%. The impact elements 98 were driven at a speed of 7000 r.p.m., giving a shear rate of 350′/sec., with a power input of 1 H.P./lb. Product received from the apparatus after one pass therethrough had a sieve analysis of 95% through 20 mesh, 85% through 40 mesh, and 50% through 60 mesh, with maximum temperature rise in the pulverization chamber to 150° F. It was estimated that a hold-up of material in pulverization amounting to about 0.001 second existed for this pulverization, which, of course, can vary with the nature of the material in process.

An alternate embodiment of liquid-phase apparatus dispensing with size retention screens and scuff plates is that shown in FIGS. 24–29.

Figure 24:
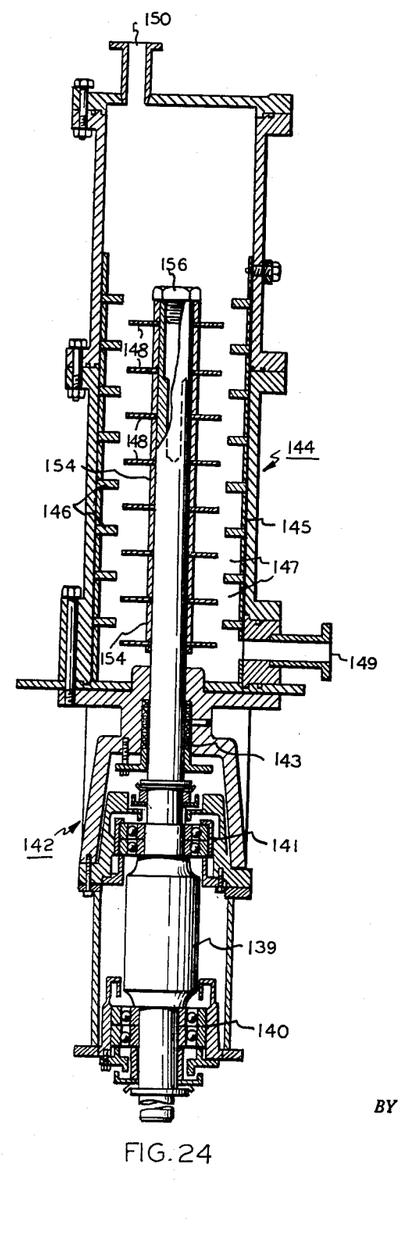
FIG. 24 is a vertical sectional view of another embodiment of pulverizing apparatus according to this invention for use with a liquid particle-supporting fluid.

The drive shaft 139 is in this instance vertically disposed and journaled in bearings 140 and 141 carried by the frame, denoted generally at 142. The shaft is sealed off by a gland and stuffing box 143 and the outboard end of the shaft is enclosed within a cylindrical housing shown generally at 144, which is sheathed on the inside with wear-resisting liners 145 and is provided with a multiplicity of fixed superposed annular ring dividers 146 extending inwards radially a total distance of about one-third of the housing diameter. These define a succession of eight pulverizing sub-chambers 147, within each of which one of the impact elements 148 is disposed centrally. A feed inlet connection 149 opens into the lowermost sub-chamber 147 and a product discharge connection 150 leads from the top of housing 144.

Each of the impact elements 148 is fixedly attached, as by tight frictional fit, to shaft 139, and sleeves 154 are provided spacing each from its neighbors, the entire assembly being retained in place on the shaft by a lock nut 156.

Impact elements 148 are preferably of the design shown in FIGS. 25–29, inclusive. In this instance they consist of thin (typically about 1/16″ thick), twelve-toothed structures wherein alternate teeth are inclined out of the plane of the rotor to right and left, as seen in FIG. 26, at an angle $e$ of about 15°. The straight-sided leading edges 157 are sharpened by beveling across the entire edge for a length of about 2″, leaving an included angle of blade of approximately 30° as seen in FIGS. 28 and 29, and the bottom side of each element is provided with four equally spaced cut out tabs 158, inclined at an angle of about 30° away from the direction of rotation to provide a pumping action within each of the sub-chambers 147.

The operation of the embodiment of FIGS. 24–29 is similar to that hereinbefore described for the apparatus of FIGS. 15–23, with speed of operation typically 2700 r.p.m. for impact elements 148 of an over-all diameter of 20″. However, the tabs 158 contribute a toroidal pumping action which advances the smaller particle sizes preferentially upwards from the lowermost sub-chamber 147 to the uppermost, pulverization to finer sizes taking place consecutively in each of the eight sub-chambers 147 as one is cleared and a new one presented to material in flow through the apparatus. The alternate design has the advantage that additional cooling can be readily obtained by providing housing 144 with an outside cooling jacket.

It should be mentioned that the same critical proportions applicable to the teeth 66, as an example, of the gas phase embodiment are equally applicable to the impact elements 98 and 148 of the liquid phase apparatus. However, certain simplifications exist for the latter, since the impacting edges lie in planes radial of the drive shaft, under which circumstances there is no centrifugal bending moment and the elements can be flat and also can be made an integral radial extension of the rotor.

The fluid-to-solid ratio employed in the practice of this invention is not very critical. A minimum of about 0.5 lb. of fluid/lb. of solids feed is required to avoid excessive inter-particle friction which releases objectionable heat in the pulverization region. Where conveying of the solids by fluid flow is desired, the ratio of fluid-to-solid is increased to the extent necessary. It is generally preferred to utilize in excess of about 2 lbs. fluid/lb. solid feed to minimize the gross temperature rise in the system. With fluid conveying of feed, fluid to solid ratios of 30:1 and even higher proved entirely practicable.

The feed supplied to the apparatus is prepared in conventional manner, it being desirable to limit the particle size to about 1/2″ or less to avoid physical sticking or jamming. The product handling is also conventional, in that the pulverized solids are separated from any fluids in accompaniment by settling, cyclonic segregation, filtration or similar techniques. Auxiliary apparatus for separating coarse or oversize product and recycling this to the feed is oftentimes desirable and screens, classifiers, sifters and the like can be employed. It is sometimes advantageous to incorporate fluid classification devices as integral features of the apparatus design and much freedom exists for the inclusion of peripherally disposed skimmers or the like in the pulverization chamber wall for automatic withdrawal of oversize particles with recycle to feed while permitting fine particles to sweep out of the product collection vent.

In general, thinner, knife-like impact elements have been found advantageous for the pulverization of polymeric materials, or substances having properties resembling polymers, whereas thicker elements can be employed for metals. In this connection, pulverization efficiency decreases as impact element wear and deformation occur during surface, and it is ultimately necessary to reshape or replace the elements.

There is considerable freedom of choice in the matter of a support fluid. Thus, if a liquid slurry product is desired, the use of a liquid-phase support medium is advantageous. Conversely, for a dry product, a gaseous support fluid is preferred. On the other hand, the lubricating characteristics inherent in liquids sometimes permit pulverization of materials, such as tacky or sticky substances, which would otherwise be very difficult.

From the foregoing it will be understood that this invention can be modified in numerous respects without departure from its essential spirit, and it is intended to be limited only by the scope of the following claims.

I claim:
1. A process for pulverizing highly extensible materials at ordinary temperatures comprising, in sequence, suspending coarse particles of said materials in an inert fluid medium, impacting said coarse particles of said materials at impact rates which strain said materials past the point of particle fracture more rapidly than the stresses set up in said materials can be dissipated by plastic deformation of the molecular structure of said materials and, in any case, at impact rates which elongate said particles an amount less than about 30% of ultimate elongation prior to particle fracture, and withdrawing said materials suspended in said inert fluid medium from the region of said impacting.

2. A process for pulverizing highly extensible materials at ordinary temperatures to a product size of about −20 to about −325 mesh size comprising, in sequence, suspending coarse particles of said materials in an inert fluid medium, impacting said coarse particles of said materials at impact rates which strain said materials past the point of particle fracture more rapidly than the stresses set up in said materials can be dissipated by plastic deformation of the molecular structure of said materials and, in any case, at impact rates which elongate said particles an amount less than about 30% of ultimate elongation prior to particle fracture, and withdrawing said materials suspended in said inert fluid medium from the region of said impacting.

3. A process for pulverizing highly extensible materials at ordinary temperatures according to claim 2 wherein said impact rates vary from about 600 feet/sec. to about 2500 feet/sec.

4. An apparatus for the pulverizing of highly extensible materials suspended in an inert fluid comprising, in combination, a power-driven rotor mounted for high speed rotation within an enclosure defining a size reduction chamber, said rotor being provided with a multiplicity of streamlined impact elements mounted peripherally thereof, said impact elements having a length-to-thickness ratio of between about 6:1 and 15:1, an attack angle of less than about 15°, and a height-to-length ratio as well as a ratio of projected area at crest to area at base both less than about 2, means introducing the feed to be pulverized in a generally radial direction with respect to said streamlined impact elements, and means for withdrawing as product from said enclosure material which has cleared said streamlined elements.

References Cited in the file of this patent

UNITED STATES PATENTS

| | | |
|---|---|---|
| 1,708,123 | Day | Apr. 9, 1929 |
| 2,237,401 | Asbury | Apr. 8, 1941 |
| 2,412,586 | Knowland | Dec. 17, 1946 |
| 2,546,860 | Klagsbrun | Mar. 27, 1951 |
| 2,609,150 | Bludeau | Sept. 2, 1952 |
| 2,623,700 | Scherer | Dec. 30, 1952 |
| 2,639,096 | Hinerfeld | May 19, 1953 |
| 3,062,457 | Willems | Nov. 6, 1962 |

UNITED STATES PATENT OFFICE
CERTIFICATE OF CORRECTION

Patent No. 3,146,958                                      September 1, 1964

Curtis C. Wallace, Jr.

It is hereby certified that error appears in the above numbered patent requiring correction and that the said Letters Patent should read as corrected below.

Column 1, lines 18 and 19, for "difficuty" read -- difficulty --; line 29, for "objectonable" read -- objectionable --; column 2, line 5, for "upustanding" read -- upstanding --; line 43, after "FIG. 25," insert -- and --; column 6, line 46, before "side" insert -- with --; column 8, line 27, strike out "in"; column 12, line 55, for "surface" read -- service --.

Signed and sealed this 15th day of December 1964.

(SEAL)
Attest:

ERNEST W. SWIDER                                      EDWARD J. BRENNER
Attesting Officer                                          Commissioner of Patents